Prindle & Wellfare.
Lantern.
Nº 72900.  Patented Dec. 31, 1867
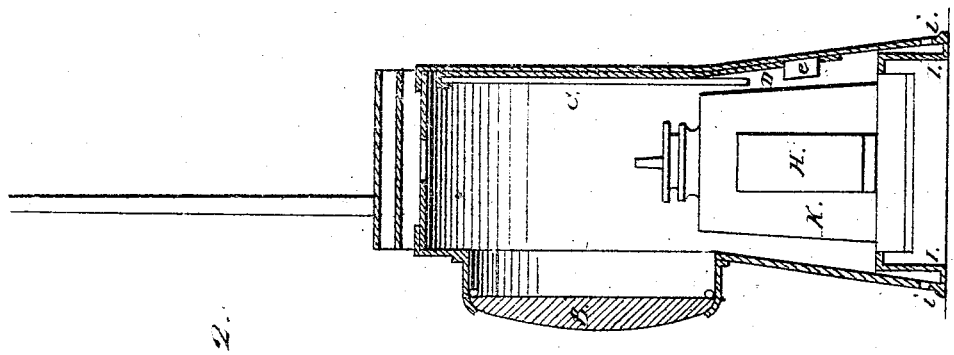
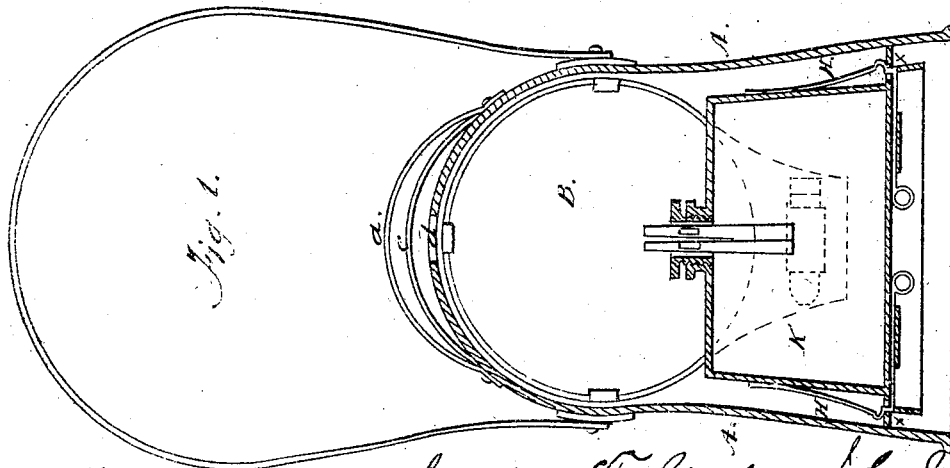

United States Patent Office.

E. T. PRINDLE AND JOHN WELLFARE, OF AURORA, ILLINOIS.

Letters Patent No. 72,900, dated December 31, 1867.

IMPROVEMENT IN LANTERNS.

*The Schedule referred to in these Letters Patent and making part of the same.*

TO ALL WHOM IT MAY CONCERN:

Be it known that we, E. T. PRINDLE and JOHN WELLFARE, of Aurora, in the county of Kane, and in the State of Illinois, have invented certain new and useful Improvements in "Lanterns;" and do hereby declare that the following is a full, clear, and exact description thereof, reference being had to the accompanying drawings and to the letters of reference marked thereon.

In the annexed drawings, making part of this specification, A represents the case of the lantern, which is constructed of metal, and made open at its bottom. This case is provided with an opening, $d$, in its upper end, which said opening is covered by two curved plates, $a$ and $c$, one raised above the other, and the lower one raised a little above the opening $d$. The front side of the case A is provided with a "bull's-eye" glass, B, and back of this bull's-eye, and secured to a metallic slide, D, on the inside and back of the case, is an annular-looking glass, C. The slide D is secured in position by means of a pin, $e$, or its equivalent, which passes through a loop, said loop passing through a slot in the slide.

K represents a lamp, constructed in any of the known and usual ways, which is slipped into the case A from its bottom. This lamp is provided with two metallic springs, H H, which are fastened to its ends, and which are bent under the bottom of the lamp. These springs have shoulders, which catch upon ledges or flanges on the inside of the case for the purpose of holding the lamp in position in the case. The lantern case A is provided, on its inside and at its lower end, with a lining, I, said lining setting out a little from the case, so as to leave a chamber or air-passage between it and the case. The case A is provided, near its bottom also, with a series of perforations or holes, which admit air to the chamber above spoken of. Air is furnished to the lamp K through the perforations $i$. The lining I breaks the draught of air or wind, so that a steady current of air is supplied to the lamp in the direction of the flame.

Having thus fully described our invention, what we claim as new, and desire to secure by Letters Patent, is—

The arrangement of the case A, the bull's-eye B, glass C, and lamp K, the case being provided with a lining, I, and with perforations $i$, whereby a steady current of air is supplied to and in the direction of the lamp flame, substantially as and for the purpose specified.

In testimony that we claim the foregoing, we have hereunto set our hands this 12th day of February, 1867.

E. T. PRINDLE,
JNO. WELLFARE.

Witnesses:
AUGUSTUS BAUER,
A. A. JOHNSON.